United States Patent
Nishiyama

(10) Patent No.: US 8,810,672 B2
(45) Date of Patent: Aug. 19, 2014

(54) IMAGE PROCESSING METHOD, IMAGE PROCESSING DEVICE, AND RECORDING MEDIUM FOR SYNTHESIZING IMAGE DATA WITH DIFFERENT FOCUS POSITIONS

(75) Inventor: Tomohiro Nishiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 13/486,338

(22) Filed: Jun. 1, 2012

(65) Prior Publication Data

US 2012/0314104 A1 Dec. 13, 2012

(30) Foreign Application Priority Data

Jun. 8, 2011 (JP) ................................ 2011-128466

(51) Int. Cl.
*H04N 5/225* (2006.01)
(52) U.S. Cl.
USPC ..................................... 348/218.1; 348/222.1
(58) Field of Classification Search
USPC ............................................ 348/218.1, 222.1
See application file for complete search history.

(56) References Cited

U.S. PATENT DOCUMENTS

| 6,023,535 A * | 2/2000 | Aoki ............................. 382/299 |
| 2006/0072041 A1 * | 4/2006 | Kii ................................. 348/586 |
| 2007/0053018 A1 * | 3/2007 | Tseng ............................. 358/486 |
| 2007/0229653 A1 | 10/2007 | Matusik et al. |
| 2008/0043096 A1 | 2/2008 | Vetro et al. |
| 2010/0103175 A1 | 4/2010 | Okutomi et al. |
| 2012/0013642 A1 * | 1/2012 | Sumi .............................. 345/629 |
| 2012/0155784 A1 | 6/2012 | Nishiyama |
| 2012/0287249 A1 * | 11/2012 | Choo et al. ....................... 348/47 |

FOREIGN PATENT DOCUMENTS

| JP | 2010-224886 A | 10/2010 |
| WO | 2008/050904 A | 5/2008 |

OTHER PUBLICATIONS

R. Ng, et al., "Light Field Photography with a Hand-Held Plenoptic Camera", Stanford University Computer Science Tech Report CSTR Feb. 2005.

S. Aoki, "Super Resolution Processing by Plural Number of Lower Resolution Images", Ricoh Technical Report, No. 24, Nov. 1998.

* cited by examiner

*Primary Examiner* — Gevell Selby
(74) *Attorney, Agent, or Firm* — Fitzpatrick, Cella, Harper & Scinto

(57) ABSTRACT

In accordance with an object desired to be brought into focus, aliasing is canceled, and the resolution of an output image data is increased. When a plurality of pieces of image data captured at multiple viewpoints is synthesized at a predetermined focus position, a weight for the synthesis is determined so as to reduce aliasings included in frequency characteristics of the plurality of pieces of image data.

14 Claims, 13 Drawing Sheets

IMAGE PROCESSING METHOD, IMAGE PROCESSING DEVICE, AND RECORDING MEDIUM FOR SYNTHESIZING IMAGE DATA WITH DIFFERENT FOCUS POSITIONS

BACKGROUND OF THE INVENTION

1. Field of the Invention

The present invention relates to an image processing method, image processing device, and recording medium that increase resolution, in an image capturing apparatus obtaining a plurality of pieces of image data.

2. Description of the Related Art

Since camera focus positions are adjusted during image capturing, when image capturing is performed by erroneous focusing, it is necessary to perform image capturing again. In addition, when it is desired to obtain image data focused on each of a plurality of objects having different perspectives, it is necessary to perform image capturing by focusing for each object.

In recent years, techniques called light field photography have been developed that obtains image data from multiple viewpoints by adding a new optical element in an optical system, and adjusts a focus position by image processing.

According to these techniques, since focus adjustment can be performed after image capturing, there is an advantage of being able to compensate the failure of focus adjustment during image capturing by image processing. Furthermore, by changing the image processing method, there are advantages of being able to obtain image data focused on any object in an image, from one piece of captured image data, and to reduce the number of times of image capturing.

In light field photography, the directions and intensities (light field, hereinafter abbreviated to LF) of light beams passing through a certain position, of a plurality of positions in space are obtained from multi-viewpoint images. Then, an image when formed on a virtual sensor is calculated by using the information of LF. Mathematical properties, mathematical bases and the like related to LF are discussed by R. NG, ("Light Field Photography with a Hand-held Plenoptic Camera" by R. NG, M. Levoy, M. Bredif, G. Duval, M. Horowitz, P. Hanrahan, Stanford Tech Report CTSR 2005-02, 2005).

By setting the position of this virtual sensor as appropriate, it is possible to perform the above-described focus adjustment after image capturing. Hereinafter, the processing for calculating an image that a virtual sensor obtains from multi-viewpoint images is referred to as reconstruction processing.

As image capturing apparatuses for obtaining an LF, plenoptic cameras in which a microlens array is placed behind a main lens, and camera arrays in which small cameras are arrayed have been known. An image when a sensor is virtually placed can be reconstructed after image capturing, from an obtained LF in any image capturing apparatus. At this time, it is possible to adjust, after image capturing, also the depth of field by changing the range of the LF to be reconstructed.

As methods for reconstructing an image on a virtual sensor from an LF, methods for projecting and converting a plurality of pieces of obtained image data on a virtual sensor to add and average the resultant data have been known (WO 2008/050904).

In addition, other than LF, as methods for obtaining high-resolution image data from a plurality of pieces of image data obtained by one camera, techniques that synthesize a plurality of pieces of pixel-shifted image data and increase resolution have been known ("Super Resolution Processing by Plural Number of Lower Resolution Images" by Shin Aoki, Ricoh Technical Report No. 24, November, 1998).

However, in the method of WO 2008/050904, aliasing due to the sampling of image capturing elements is generated in an image after reconstruction. In the method of WO 2008/050904, although sampling intervals are optionally finely set in order to increase resolution, there is a problem that substantial output resolution becomes 1/the number of angle divisions by aliasing. In order to increase output resolution, it is necessary to cancel aliasing.

In addition, in the method of "Super Resolution Processing by Plural Number of Lower Resolution Images" by Shin Aoki, Ricoh Technical Report No. 24, November, 1998, the method for generating one piece of image data in which aliasing is canceled relative to a plurality of pieces of obtained image data is described. However, this technique cannot handle the case where there is a desire to bring any object into focus after image capturing.

SUMMARY OF THE INVENTION

It is an object of the present invention to cancel aliasing in accordance with an object desired to be brought into focus, and to increase the resolution of output image data.

An image processing device according to the present invention includes a weight determination unit configured to, in order to synthesize at a predetermined focus position a plurality of pieces of image data captured at multiple viewpoints, determine a weight for the synthesis so as to reduce aliasing element included in frequency characteristics of the plurality of pieces of image data.

According to the present invention, it is possible to cancel aliasing in accordance with an object desired to be brought into focus, and to increase the resolution of output image data.

Further features of the present invention will become apparent from the following description of exemplary embodiments with reference to the attached drawings.

DESCRIPTION OF THE EMBODIMENTS

Preferred embodiments of the present invention will now be described in detail with reference to the drawings. However, components described in this embodiment are only illustrative, and there is no intention to limit the scope of the present invention to them.

EXAMPLE 1

Figure 13:
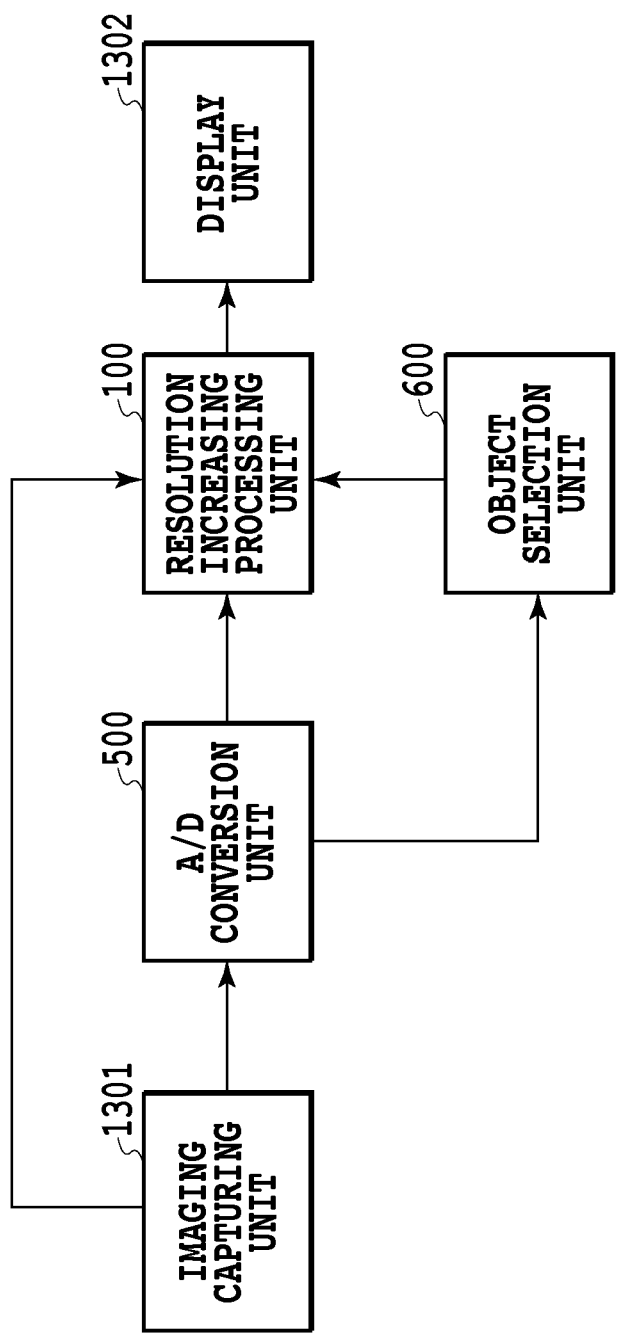
FIG. 13 is a block diagram showing a configuration of an image capturing apparatus according to one embodiment.

FIG. 13 is a block diagram showing a configuration example of an image capturing apparatus to which the present invention can be applied in one embodiment.

In FIG. 13, an image capturing unit 1301 includes a zoom lens, a focusing lens, a blurring correction lens, a diaphragm, a shutter, an optical low pass filter, an IR cut filter, a color filter, and an image capturing element made of a CMOS, a CCD or the like. The image capturing unit 1301 detects the amount of light of an object. An A/D conversion unit 500 converts the amount of light of the object into a digital value. A user selects the object brought into focus through an object selection unit 600. A resolution increasing processing unit 100 outputs reconstructed image data based on the selected information and information input from the A/D conversion unit 500 and the image capturing unit 1301. The image that the reconstructed image data indicates is displayed on a display unit 1302.

Figure 1:
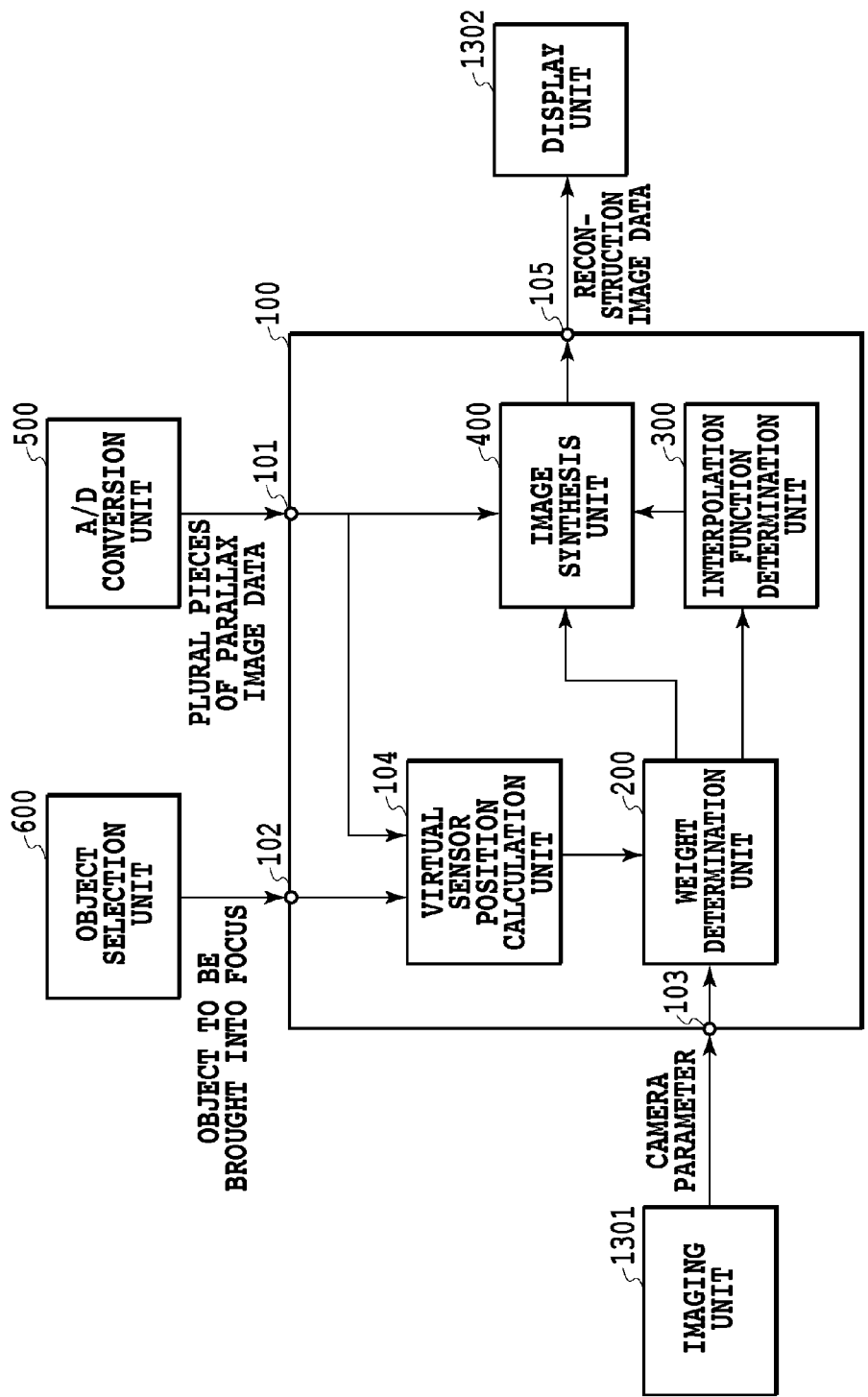
FIG. 1 is a block diagram showing a configuration of a resolution increasing processing unit 100.

A configuration of the resolution increasing processing unit 100 is shown in FIG. 1. Image data having a parallax is input through a plural pieces of image data input terminal 101 from the A/D conversion unit 500. Selection information of an object is input through a focus position input terminal 102 from the object selection unit 600. Parameters representing the properties of the image capturing unit 1301 are input through a camera parameter input terminal 103. A virtual sensor position calculation unit 104 calculates the position at which the object selected by the object selection unit 600 is imaged inside the image capturing unit 1301. A weight determination unit 200 determines the corresponding weight for multiplying each piece of image data from the position of the virtual sensor and the camera parameters. An interpolation function determination unit 300 determines, based on the information of the weights, an interpolation function when the pieces of image data are interpolated. An image synthesis unit 400 interpolates the pieces of image data based on the interpolation function determined by the interpolation function determination unit 300, and multiplies the pieces of image data by the weights determined by the weight determination unit 200 to add the resultant. Reconstructed image data is output by a reconstruction image data output terminal 105.

The details of the weight determination unit 200, the interpolation function determination unit 300, and the image synthesis unit 400 will be described below.

Figure 2:
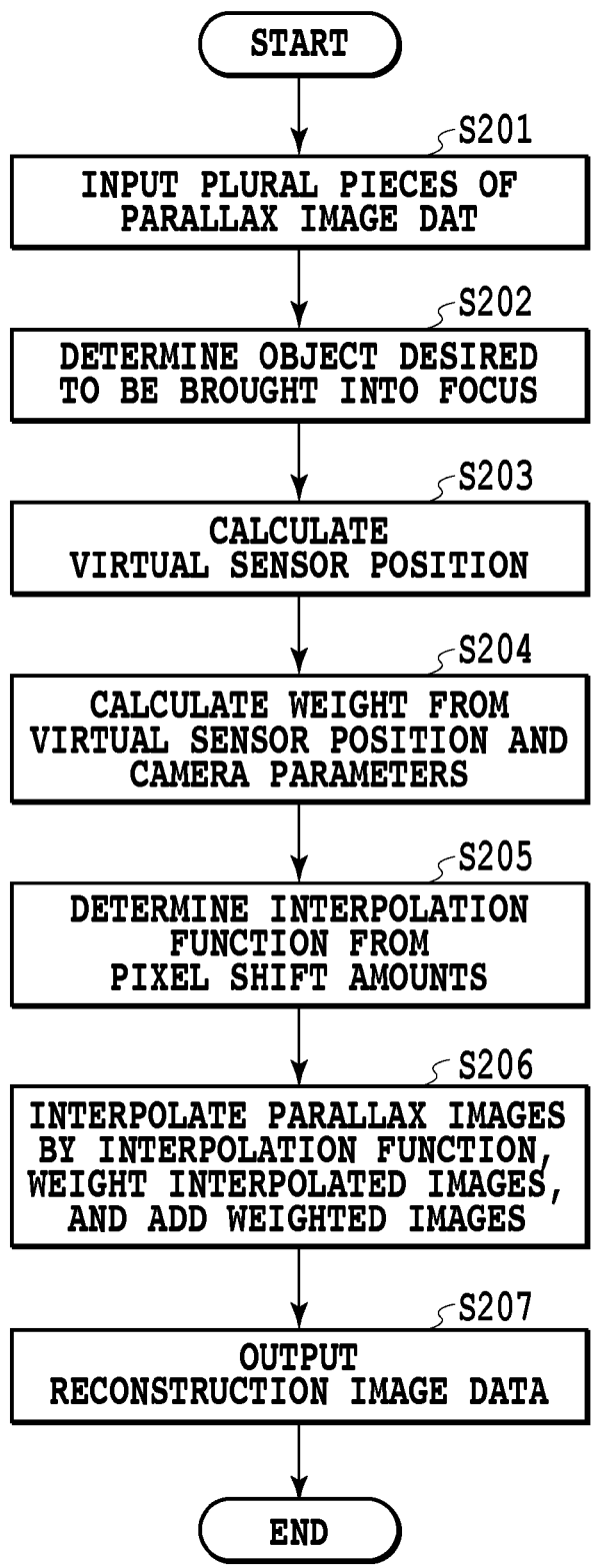
FIG. 2 is a flow chart showing the operation of the resolution increasing processing unit 100.

FIG. 2 shows a flow chart indicating the outline of the operation of the resolution increasing processing unit 100. A CPU included in the resolution increasing processing unit 100 that is not shown reads a program from a storage unit, and controls the processing of each unit in accordance with the program, as one example. Thereby, this operation is performed. The details of the processing performed in each unit will be described below.

First, image data having a parallax is input through the plural pieces of image data input terminal 101 from the image capturing apparatus (S201). Next, a user determines an object brought into focus through the object selection unit 600 (S202), and the information is input by the focus position input terminal 102. The virtual sensor position calculation unit 104 calculates the position at which the object is imaged based on the information (S203). Parameters exhibiting the properties of the image capturing unit 1301 are input from the camera parameter input terminal 103. The weight determination unit 200 calculates the corresponding pixel shift amount of each piece of image data from the virtual sensor position and the camera parameters, and determines weights (S204). The interpolation function determination unit 300 determines an interpolation function based on the pixel shift amounts calculated by the weight determination unit 200 (S205). The image synthesis unit 400 interpolates the pieces of image data on the interpolation function, and multiplies the pieces of image data by the weights to add the resultant (S206). Image data generated by the image synthesis unit 400 is output from the reconstruction image data output terminal 105, and the operation of the resolution increasing processing unit 100 is ended (S207). The details of the weight determination unit 200, the interpolation function determination unit 300, and the image synthesis unit 400 will be described below.

(Conceptual Diagram of the Image Capturing Unit 1301)

Figure 5A:
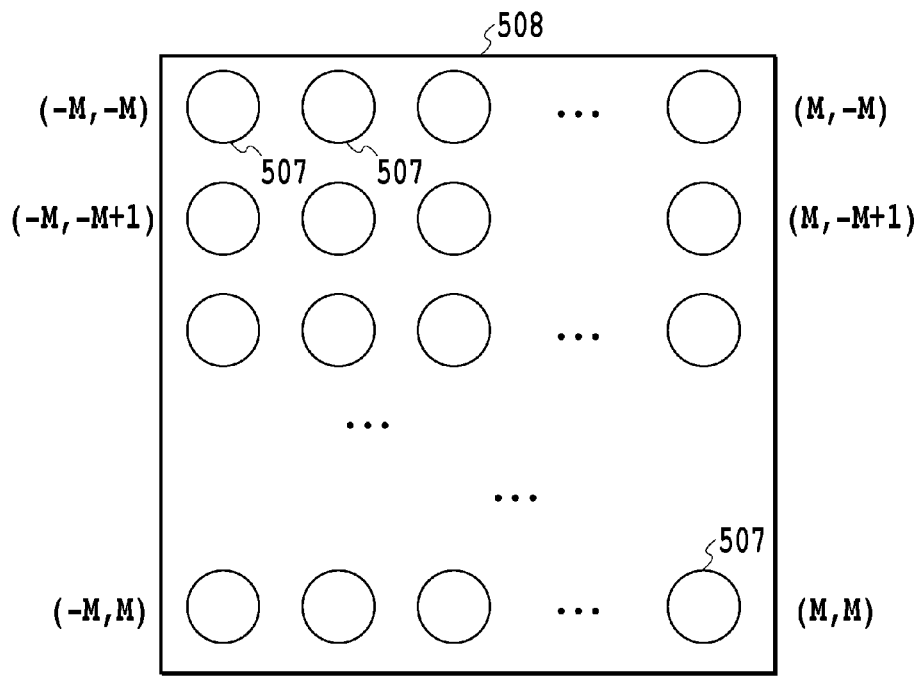
FIGS. 5A and 5B are conceptual diagrams of an image capturing unit 1301.
Figure 5B:
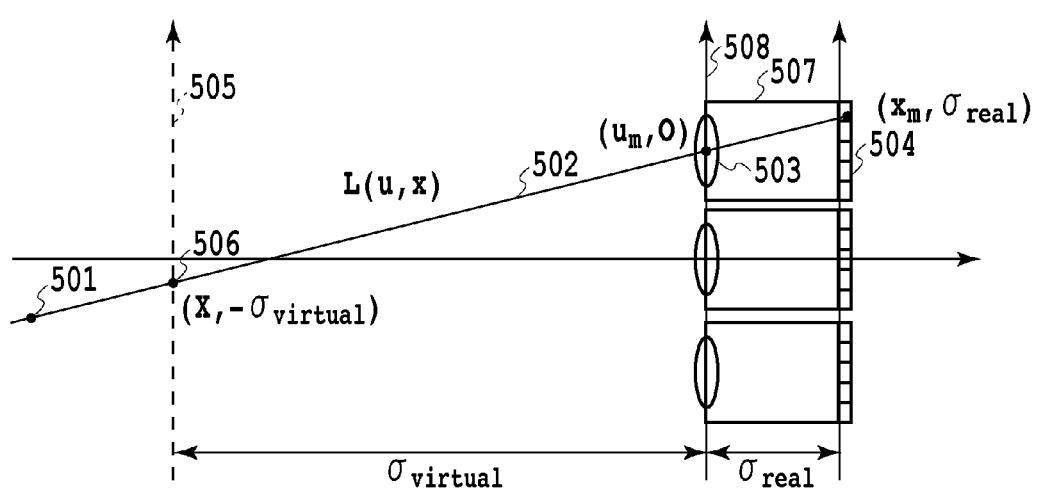

FIGS. 5A and 5B show a conceptual diagram of the image capturing unit 1301.

FIG. 5A is a view when the image capturing unit 1301 is viewed from the front. Reference numeral 507 represents a small camera. The small cameras 507 are numbered (−M, −M), (−M+1, −M), ..., (M, −M), (−M, −M+1) ..., (M−1,M), and (M,M) from the upper left toward the lower right. Here, although there are the small cameras 507 of $(2M+1)^2$, any number of small cameras may actually be vertically and horizontally arrayed. Reference numeral 508 is a plane on which the small cameras 507 are arrayed.

FIG. 5B is a cross-sectional view cut along plane that is vertical to the plane 508 in FIG. 5A. Reference numeral 501 represents an object. Reference numeral 503 represents the lenses of the small camera 507 schematically by using one lens. Reference numeral 504 represents an image capturing element of the small camera. Reference numeral 505 represents a virtual sensor. A virtual sensor is a concept for deriving, by calculation after image capturing, what image data is obtained when there is an image capturing element at the position, by virtually assuming the image capturing element at the position. Reference numeral 502 is a light beam connecting the center of the optical axis of the lens 503 and the object 501. Reference numeral 506 is the intersection point of the light beam 502 with the virtual sensor 505.

If the object 501 is an object that is in focus on the virtual sensor 505, the object 501 exists on the virtual sensor, and the intersection point 506 agrees with the object 501. In FIG. 5, the distance between the image capturing element 504 and the lens 503 is defined as $\sigma_{real}$, and the distance between the virtual sensor 505 and the lens 503 is defined as $\sigma_{virtual}$.

The coordinates of the center of the optical axis of the lens 503 of the mth small camera 507 are defined as $(u_m, 0)$, and the coordinates of the image capturing element 504 are defined as $(x_m, \sigma_{real})$. The coordinates of the intersection point 506 are defined as $(X, -\sigma_{virtual})$. Here, $\sigma_{virtual}$ is a positive value. The intensity of light obtained in the coordinates $(x_n, \sigma_{real})$ of the image capturing element 504 below the mth small camera 507 is represented as $L(u_m, x_m)$. The argument means a light beam connecting $u_m$ and $x_m$.

A two-dimensional vector on the plane 508 is represented by $u_m, x_m$, and X. If small cameras each have a zoom function, $\sigma_{real}$ is a variable parameter.

(Operation of the Image Synthesis Unit 400)

With reference to FIGS. 4 to 8, the operation of the interpolation, weighting, and reconstruction (addition) of pieces of image data by the image synthesis unit 400 will be described. The image synthesis unit 400 functions as an image processing device.

Figure 4:
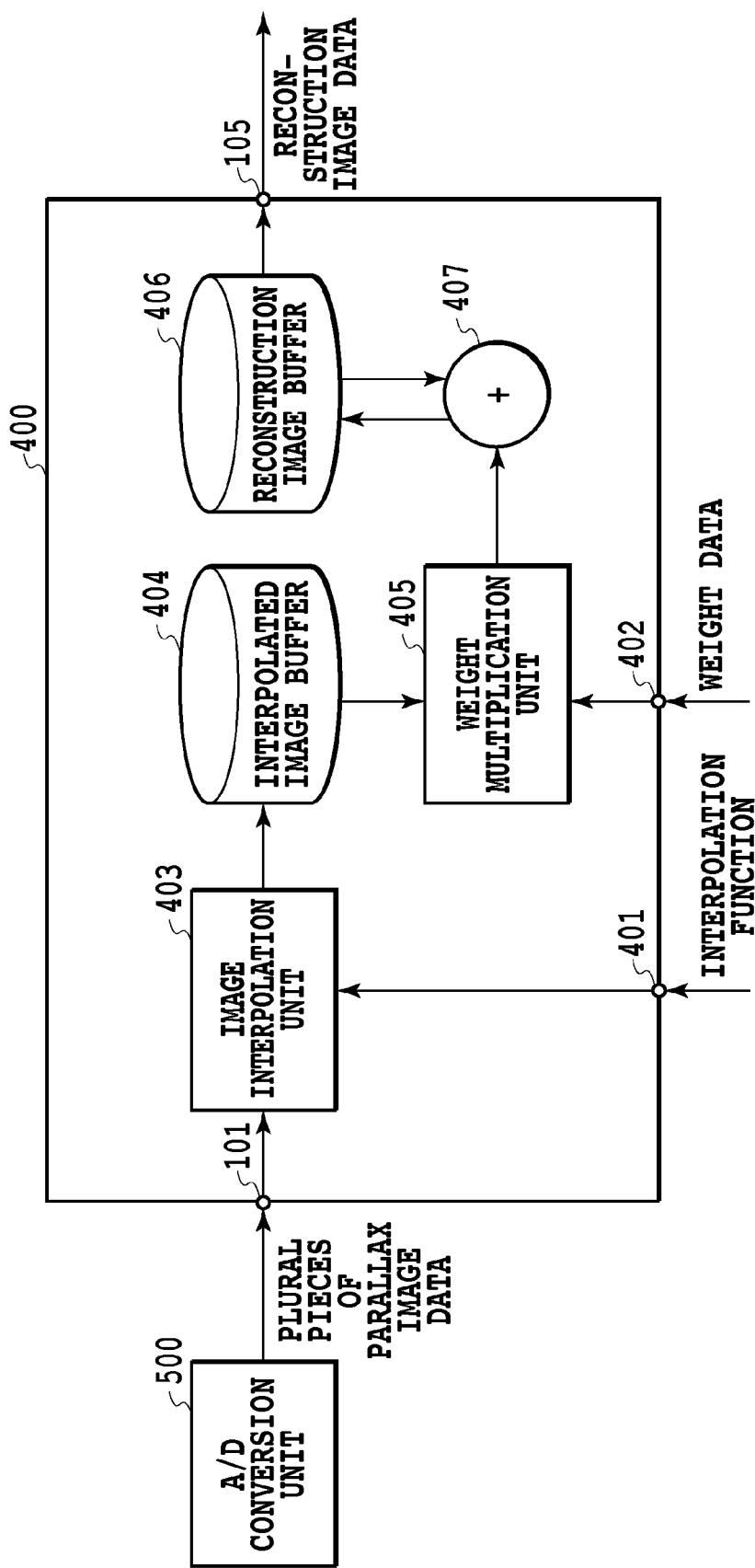
FIG. 4 is a block diagram showing a configuration of an image synthesis unit 400.

First, FIG. 4 shows a block diagram of the image synthesis unit 400. An interpolation function determined by the interpolation function determination unit 300 is input from an interpolation function input terminal 401. The corresponding weight for multiplying each piece of image data, determined by the weight determination unit 200 is input from a weight input terminal 402.

An image interpolation unit 403 interpolates pieces of image data input from the plural pieces of parallax image data input terminal 101 by the interpolation function input from the interpolation function input terminal 401. Interpolation methods will be described below. A plurality of pieces of interpolated image data is stored in an interpolated image buffer 404. A weight multiplication unit 405 reads one piece of image data from the interpolated image buffer 404, and multiplies the entire image by a corresponding weight. Image data after reconstruction is stored in a reconstruction image buffer 406. An adder 407 adds the weighted image data to the image data read from the reconstruction image buffer 406.

Figure 6:
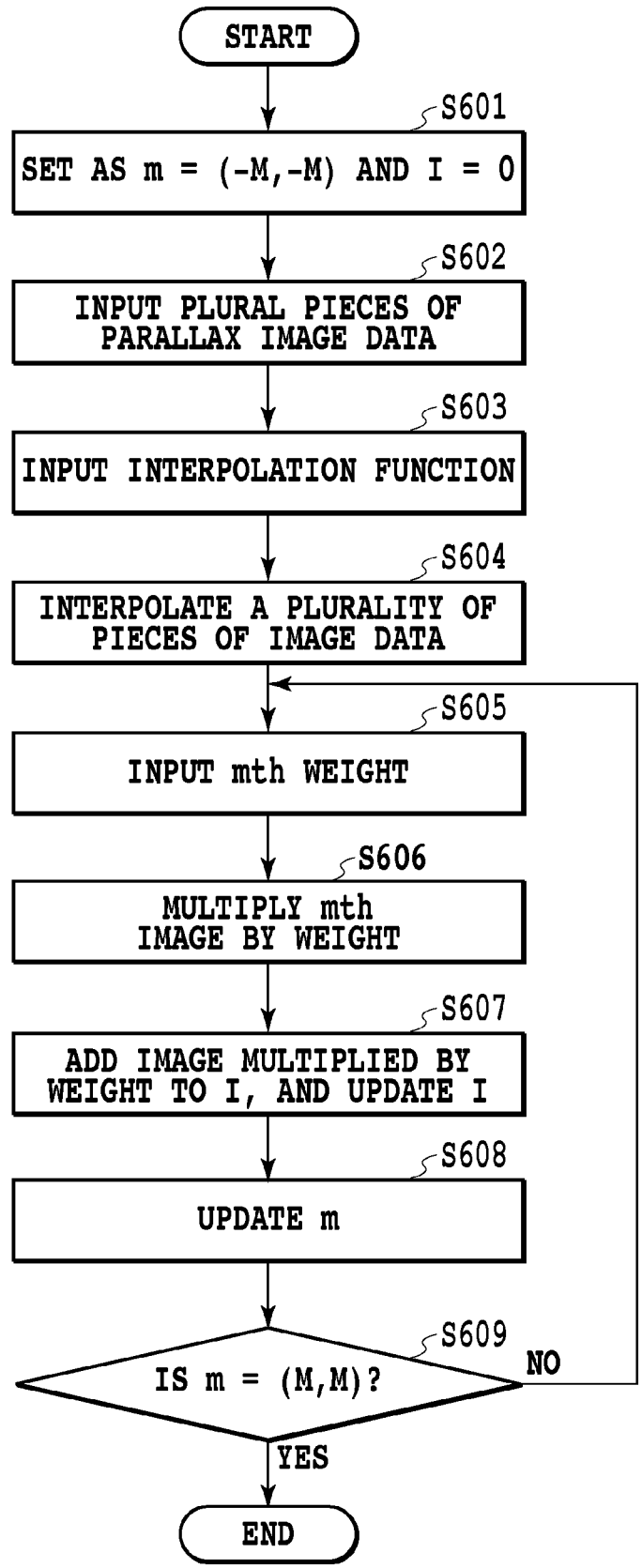
FIG. 6 is a flow chart showing the operation of the image synthesis unit 400.

With reference to the flow chart in FIG. 6, the operation of the image synthesis unit 400 will be described. The small camera number m is updated from the upper left toward the lower right in FIG. 5A.

The image synthesis unit 400 sets the small camera number m at (−M, −M), and the values of the pieces of image data I(i, j) of the reconstruction image buffer 406 are initialized to I(i, j)=0 for all (i, j) (S601). A plurality of pieces of parallax image data is input from the plural pieces of parallax image data input terminal 101 (S602). An interpolation function is input from the interpolation function input terminal 401 (S603). The image interpolation unit 403 interpolates $(2M+1)^2$ pieces of image data, and the pieces of interpolated image data are stored in the interpolated image buffer 404 (S604). The mth weight $c_m$ is input from the weight input terminal 402 (S605). The weight multiplication unit 405 reads the piece of image data corresponding to the mth small camera from the interpolated image buffer 404, and multiplies the entire image data by the weight $c_m$ (S606). By adding the piece of image data obtained by multiplying the entire image data by the weight, to I(i, j) for each pixel, and I(i, j) is updated (S607). The processing updates m (S608), and determines whether m is m=(M, M). If not, the processing returns to S605. If m is m=(M, M), the operation ends.

The principle of operation of the image synthesis unit 400 will now be described.

First, the interpolation processing performed in S604 will be described. Light information obtained by the image capturing element below the mth small camera 507 cannot specify where the light has passed through in the mth lens 503. Therefore, in the present embodiment, it is assumed that the light beam has passed through the center of the optical axis of the lens 503. When the intensity of light of the point 506 (X, $-\sigma_{virtual}$) on the virtual sensor 505 is obtained, the coordinate $x_m$ of the image capturing element 504 being on the straight line connecting the point 506 on the virtual sensor and the center ($u_m$, 0) of the optical axis of the lens 503 is specified. From FIGS. 5A and 5B, $x_m$ satisfies the following relational formula:

[Formula 1]

$$x_m = \frac{u_m(\sigma_{virtual} + \sigma_{real}) - X\sigma_{real}}{\sigma_{virtual}} = \left(1 - \frac{1}{\alpha}\right)u_m + \frac{X}{\alpha} \quad (1)$$

where α is defined as

[Formula 2]

$$\alpha \equiv -\frac{\sigma_{virtual}}{\sigma_{real}} \quad (2)$$

If information obtained by the sensor of the mth small camera 507 is projected on the virtual sensor 505, projected information is, by defining the pitch of pixels of the image capturing element as $\Delta_{real}$, and defining the interpolation function as σ,

[Formula 3]

$$\sum_{n'} \varphi\left(\frac{(x_m - u_m)}{\Delta_{real}} - n'\right) L(u_m, n'\Delta_{real}) \quad (3)$$

where n' is the sum of respective ones of pixels of the image capturing element of the mth small camera 507.

If a pixel pitch of the image data after reconstruction is defined as $\Delta_{virtual}$, it is possible to write $X=i\Delta_{virtual}$, by defining i=(i, j) as a vector of an integer value. If this relational formula, the formula (1), and the formula (3) are used, an image $I_m(i,j)$ obtained by projecting the obtained information of the mth small camera 507 on the virtual sensor is

[Formula 4]

$$I_m(i, j) = \sum_{n'} \varphi\left(-\frac{u_m}{\alpha\Delta_{real}} + \frac{i\Delta_{virtual}}{\alpha\Delta_{real}} - n'\right) L(u_m, n'\Delta_{real}) \quad (4)$$

where the low pass effect due to integrating light over a part in which pixels are open is ignored.

The formula (4) can also be viewed as enlarging a times an image of the image capturing element 504 on the virtual sensor 505 and sampling the image by $\Delta_{virtual}$, or can also be viewed as sampling the image by $\Delta_{virtual}/\alpha$ on the image capturing element 504.

This is the interpolation processing performed in S604.

In S606 and S607, by multiplying $I_m$ by the weight $c_m$, the resultant is added. That is, the image data obtained by the following formula is output as reconstruction image data:

[Formula 5]

$$I(i, j) = \sum_m c_m I_m(i, j) \quad (5)$$

where the sum of m values ranges over the small camera 507 numbers.

Figure 7A:
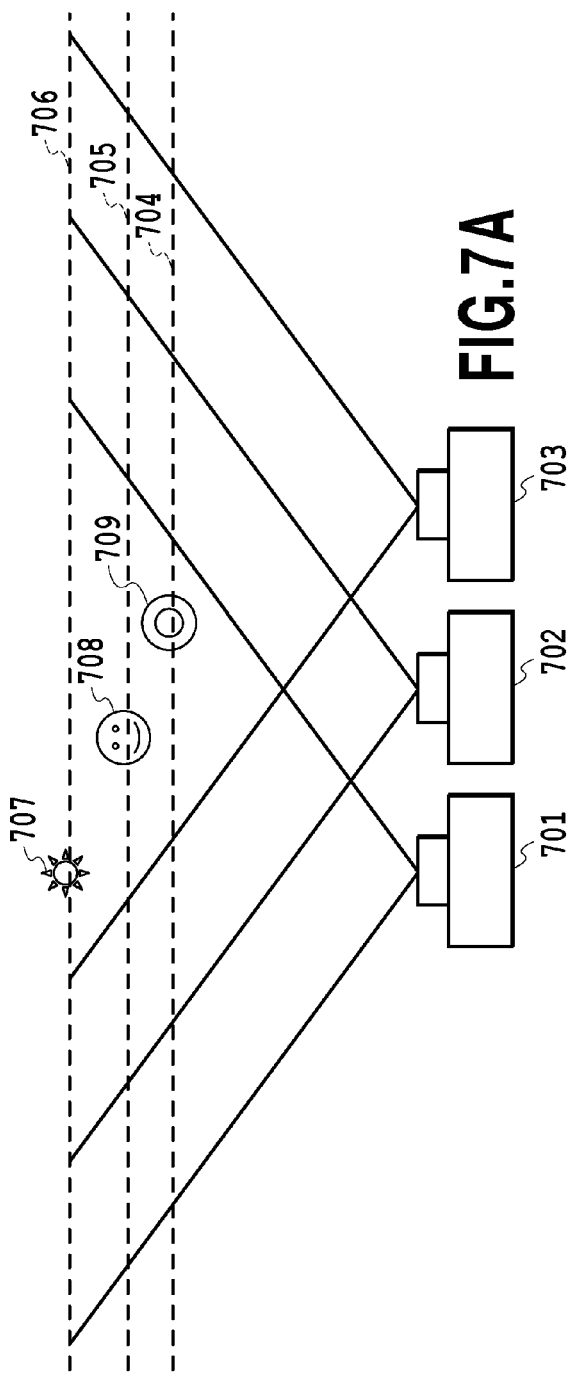
FIGS. 7A and 7B are conceptual diagrams of image capturing by a camera array.
Figure 7B:
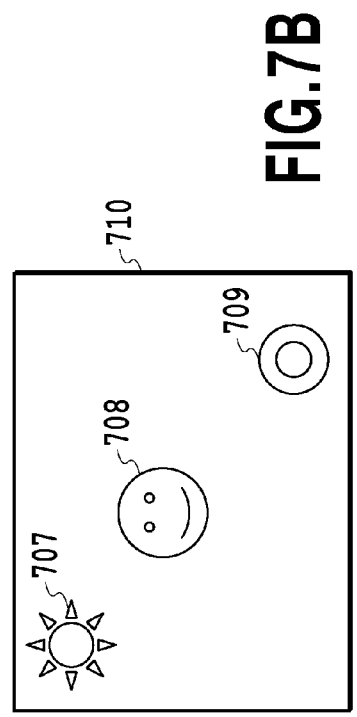
Figure 8:
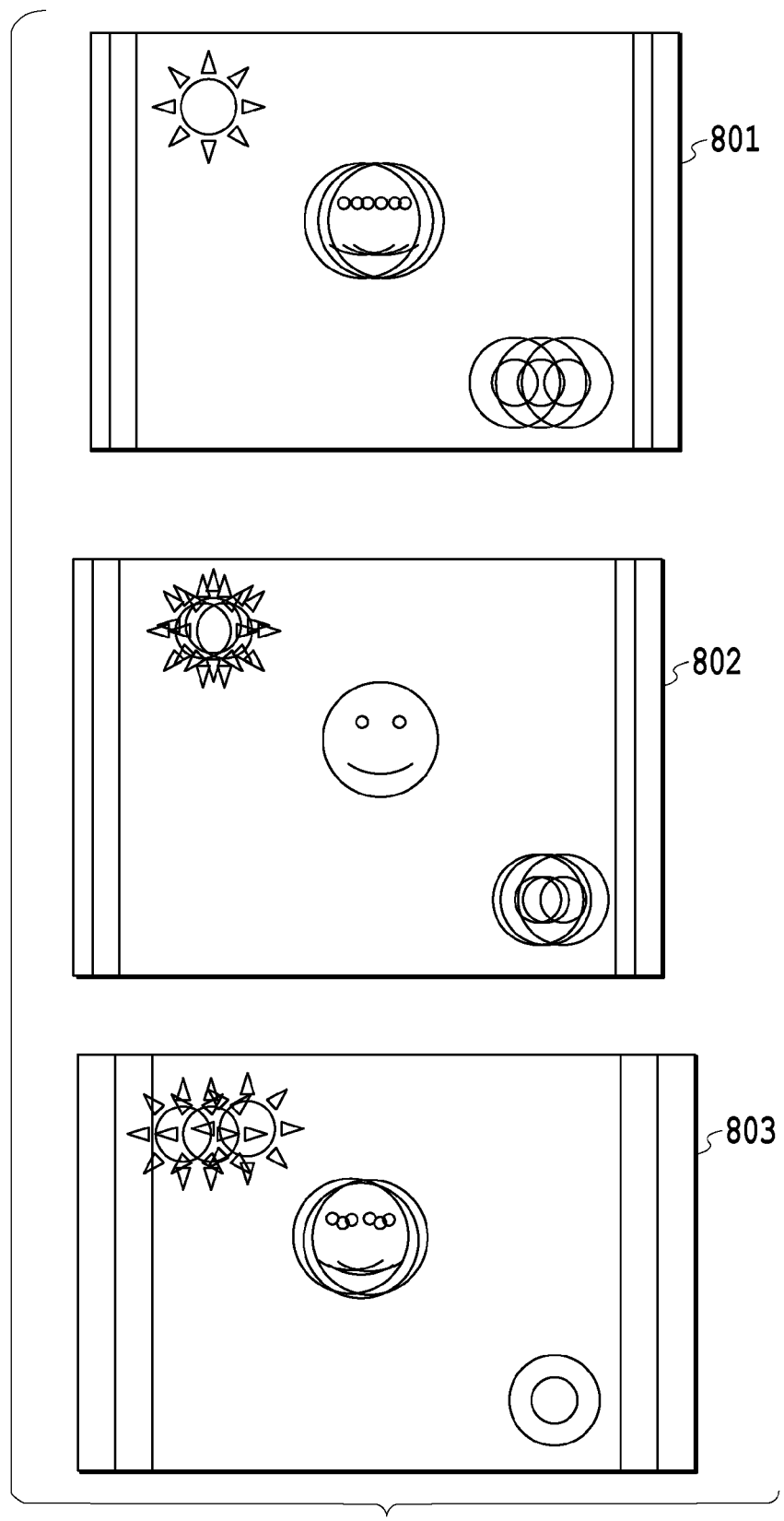
FIG. 8 is a view showing an example of pieces of image data after reconstruction.

With reference to FIGS. 7 and 8, the concept of the synthesis of image data by the image synthesis unit 400 will be described.

FIG. 7A shows a state in which the objects 501 being at different distances are captured by small cameras 701 to 703.

In FIG. 7A, Reference numerals 701 to 703 illustrate three typical small cameras of the small cameras 507. Reference numerals 704 to 706 illustrate three typical virtual sensors of the virtual sensors 505. Reference numerals 707 to 709 respectively are the objects 501 disposed at positions having different distances.

FIG. 7B shows an image obtained by the small camera 701. Reference numeral 710 is an image captured by the small camera 701. Images obtained by the small cameras 702 and 703 are images in which the objects are shifted by parallaxes corresponding to the distances from the objects 707 to 709 in the image 710.

FIG. 8 is a conceptual diagram of an image reconstructed by the image synthesis unit 400. Reference numeral 801 is an image after reconstruction when the virtual sensor position is that of the reference numeral 706. In the image 801, the object 707 is in focus, and the object 708 and the object 709 are out of focus.

Reference numeral 802 is an image after reconstruction when the virtual sensor position is that of reference numeral 705. Reference numeral 803 is an image after reconstruction when the virtual sensor position is that of reference numeral 704. In the images 802 and 803, the in-focus objects are the object 708 and the object 709, respectively. By thus moving the virtual sensor position, an image focused on a preferred object can be obtained. In addition, at this time, an advantage of the present embodiment is to increase the resolution of the in-focus object.

(Operation of the Weight Determination Unit 200)

Figure 3:
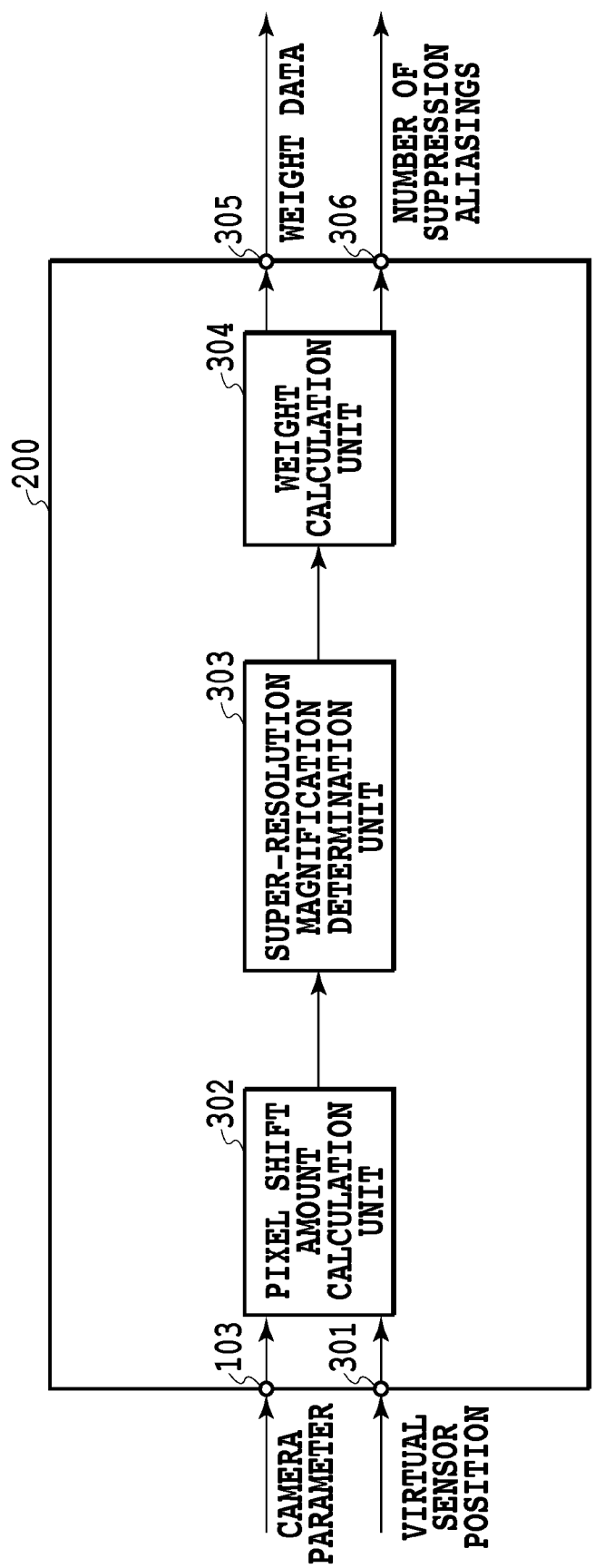
FIG. 3 is a block diagram showing a configuration of a weight determination unit 200.

With reference to FIG. 3, the operation of weight calculation by the weight determination unit 200 will be described.

A block diagram of the weight determination unit 200 is shown in FIG. 3. In FIG. 3, a virtual sensor position is input from a virtual sensor position input terminal 301. A pixel shift amount calculation unit 302 calculates a theoretical pixel shift amount from camera parameters and the virtual sensor position. There is a possibility that an actual pixel shift amount is a little different from an actual pixel shift amount theoretically derived from the camera parameters. Therefore, the pixel shift amount calculation unit 302 may calculate the actual pixel shift amount by using block-matching, an optical flow, and the like after roughly aligning an image by the theoretical pixel shift amount. If the pixel shift amount is obtained, the number of aliasings that can be suppressed in accordance with the pixel shift amount is determined (the calculation method will be described below). A super-resolution magnification determination unit 303 determines this number of aliasings as the number of aliasings to be suppressed. A weight calculation unit 304 calculates a weight based on the information of the pixel shift amount and the number of aliasings to be suppressed (the calculation method will be described below). The calculated weight is output from a weight data output terminal 305, and the number of aliasings to be suppressed is output from a super-resolution magnification output terminal 306.

The principle of operation of the weight determination unit 200 will now be described.

The shift coordinate from the center of the lens of the mth small camera 507 is represented as $x_m - u_m$. The shift amount of each piece of image data relative to the same point X of the virtual sensor is, by using the formula (1),

[Formula 6]

$$(x_m - u_m) - (x_0 - u_0) = -\frac{(u_m - u_0)}{\alpha} \quad (6)$$

The pixel shift amount is represented as how many times this shift amount of the piece of image data is as large or small as the pixel pitch of the image capturing element. Accordingly,

[Formula 7]

$$\frac{(x_m - u_m) - (x_0 - u_0)}{\Delta_{real}} = -\frac{(u_m - u_0)}{\alpha \Delta_{real}} \quad (7)$$

represents the pixel shift amount.

This is a pixel shift amount that the pixel shift amount calculation unit 302 calculates theoretically. The position coordinate of the small camera 507, and the distance between the lens of the small camera 507 and the sensor, are used for the calculation of a theoretical pixel shift amount. Accordingly, if the small camera 507 has a zoom function, the distance between the lens and the sensor during zooming is used as a parameter.

The sampling of the image capturing element 504 corresponds to the sampling of $\alpha \Delta_{real}$ on the virtual sensor, and the pixel shift amount is expressed by the formula (7). Aliasing is generated at the interval of $2\pi/(\alpha \Delta_{real})$ by sampling on an image projected on the virtual sensor, and a phase shift is caused by a pixel shift. Thus, the frequency property when an image of the mth small camera 507 is projected on the virtual sensor is

[Formula 8]

$$F[I_m](k) = F[\varphi](\alpha \Delta_{real} k) \sum_n \exp(-i 2\pi Z_n \cdot u_m) F[L']\left(k + \frac{2\pi n}{\alpha \Delta_{real}}\right) \quad (8)$$

where F[ ] represents Fourier transform, and $Z_n$ is defined as

[Formula 9]

$$Z_n \equiv -\frac{n}{\alpha \Delta_{real}} \quad (9)$$

where n represent vectors of integer components and $\Sigma$ represents the sum of the values obtained by formula (8), for all values of n. In addition,

[Formula 10]

$$F[L'](k) \quad (10)$$

represents the frequency property of light information projected on the virtual sensor. This is light information:
 unaffected by sampling by the image capturing element;
 and indicating a desire to fundamentally obtain.

Formula (9) means that aliasing generates in image data at frequency intervals of $2\pi/\alpha \Delta_{real}$, and n represents an aliasing number.

The frequency property of image data reconstructed by the image synthesis unit 400 is, in view of the weights,

[Formula 11]

$$F[\varphi](\alpha \Delta_{real} K) \sum_n \sum_m c_m \exp(-i 2\pi Z_n \cdot u_m) F[L']\left(k + \frac{2\pi n}{\alpha \Delta_{real}}\right) \quad (11)$$

Information indicating a desire to fundamentally obtain is light information projected on the virtual sensor. The frequency property can be represented as F[L'](k) by the formula (10). Thus, when the number of suppressible aliasings is N (the calculation method will be described below), the weight calculation unit 304, by using the following formula:

[Formula 12]

$$B_n \equiv \sum_m c_m \exp(-i2\pi Z_n \cdot u_m) \quad (12)$$

determines weights so that $B_0=1$ is used for n=0, and the value of $|B_n|$ is as low as possible when n is $|n| \leq N$ and $n \neq 0$ where $|B_n|$ is an amount indicating how many nth aliasings are included in the frequency property of the obtained image data. If $|B_n|$ is equal to zero, no aliasing is included. If $|B_n|$ becomes larger, many nth aliasings are included.

In addition, weights are determined so that the frequency property of the interpolation function is included up to as high frequency side as possible.

At this time, the number of suppressible aliasings is determined by the fraction portion of $Z_n \cdot u_m$ of the formula (12). Here, $Z_n \cdot u_m$ is the number of pixels of the pixel shifts between pieces of image data captured by small cameras. If pieces of captured image data of small cameras are shifted by 1/a (a is a natural number) pixel at equal intervals, it has been generally known that the image can be super-resolved up to a-fold. At this time, if a pixel shift amount is obtained, the number of aliasings (aliasings generated in accordance with the pixel shift amount) that can be canceled (suppressed) is 1/a−1.

For example, when the fraction portion of $Z_n \cdot u_m$ is 0.5, the number of aliasings that can be canceled is 1/0.5−1=1. When the fraction portion of $Z_n \cdot u_m$ is 0.2, the number of aliasings that can be canceled is 1/0.2−1=4.

The super-resolution magnification determination unit 303 calculates this number.

When suppressible aliasing numbers are −N to N, the weight calculation unit 304 determines the weight $c_m$, by solving, for example, the following simultaneous equation:

[Formula 13]

$$\sum_m c_m \exp(-i2\pi Z_{n''} \cdot (u_m - u_0)) = \delta_{n'' 0} \quad (13)$$

Where n" moves between lattice points of $[-N,N] \times [-N,N]$.

However, in the case of only this, since there is a case where this causes the absolute value of the weight to become much larger, the weight may be determined so as to minimize the following amount ($B_{n''}$)

[Formula 14]

$$\sum_m |c_m \exp(-i2\pi Z_{n''} \cdot (u_m - u_0))|^2 + \lambda \sum_m |c_m|^2 \quad (14)$$

where the second term is a regularization term introduced to suppress the absolute value of the weight, and $\lambda$ is a real-valued coefficient for determining its degree.

How to determine weights is not limited to this, and can be anything determined so that $B_{n''}=1$ is used for n"=0, and the value of $|B_{n''}|$ becomes smaller for $1 \leq |n''| \leq N$.

If the absolute value of the weight becomes larger than one or becomes a negative value, the image quality of reconstruction image data is significantly compromised by only causing the virtual sensor position to be a little shifted. Therefore, when the absolute value of the weight becomes larger than one or becomes a negative value,

[Formula 15]

$$c_m = \text{const.} \quad (15)$$

may be adopted as a robust weight for the change of the virtual sensor position, where the sum of the weights is one.

Since $Z_n$ is a value dependent on the virtual sensor position, the weight is switched in accordance with an object brought into focus.

As described above, according to the present embodiment, in order to synthesize, at a predetermined focus position, a plurality of pieces of image data captured at multiple viewpoints, weights for the synthesis of the image data are determined so as to reduce aliasings included in the frequency characteristics of the plurality of pieces of image data. The aliasings included in the frequency characteristics of image data are derived by using image shift amounts. In addition, weights for the synthesis are determined by using the number of aliasings generated in accordance with the image shift amounts. By thus determining the weights, it is possible to cancel aliasing and perform the reconstruction of the image data. As a result, by thus determining the weight, it is possible to cancel aliasing in accordance with an object indicating a desire to be brought into focus, and to perform super-resolving.

The foregoing is the principle of operation of the weight determination unit 200.

(Operation of the Interpolation Function Determination Unit 300)

A method for determining an interpolation function by the interpolation function determination unit 300 will now be described.

As described above, the weight determination unit 200 determines a weight so as to suppress the −Nth to Nth aliasings that are aliasings generated in accordance with an image shift amount.

When the −Nth to Nth aliasings can be suppressed, the interpolation function determination unit 300 determines an interpolation function so that the frequency property of the interpolation function becomes sufficiently smaller at the N+1th aliasing frequency $2\pi(N+1)/(\alpha\Delta_{real})$, and has values up to as high frequency side as possible. That is, the interpolation function determination unit 300 determines an interpolation function for the synthesis of the image data so as to suppress aliasing other than aliasing generated in accordance with the image shift amounts.

As an example,

[Formula 16]

$$\phi(x)=1 \quad 0 \leq x \leq 2/(N+1)$$

$$\phi(x)=0 \quad 2/(N+1) \leq x \leq 1 \quad (16)$$

have the characteristic.

However, the value of $|F[\phi](\alpha\Delta_{real}k)|$ is $O(1)$ when the values of k is in the vicinity of $\pi(N+1)/(\alpha\Delta_{real})$, and the interpolation function becomes sufficiently smaller in the case of $k \geq 2\pi(N+1)/(\alpha\Delta_{real})$, the interpolation function is not limited to the formula (16).

The foregoing is the operation of the interpolation function determination unit 300.

Finally, FIGS. 9A to 10B show one example of an advantage according to the present embodiment. A plane object is used for the object.

Figure 9A:
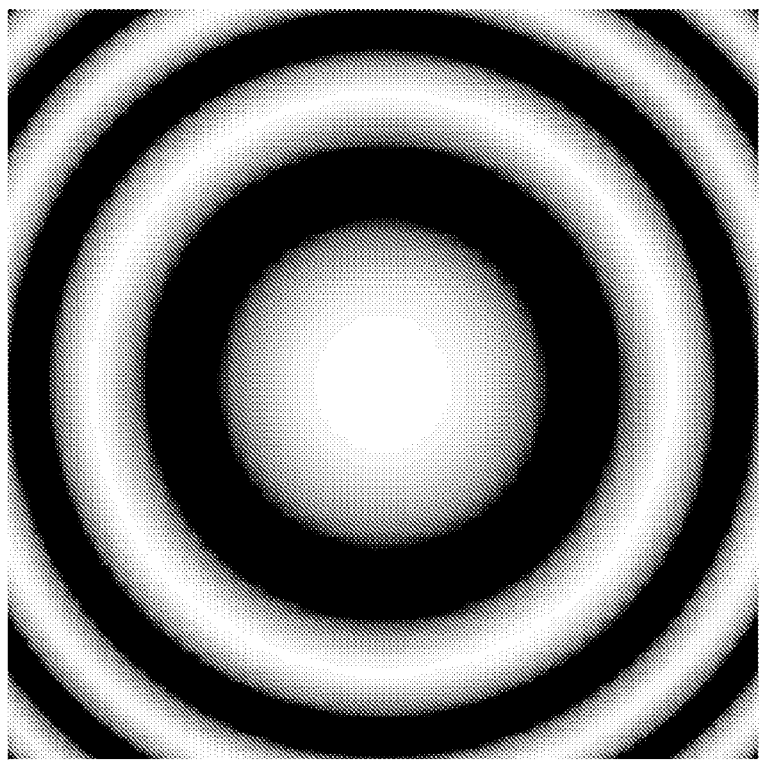
FIGS. 9A and 9B are views showing an example of an advantage of the present invention.
Figure 9B:
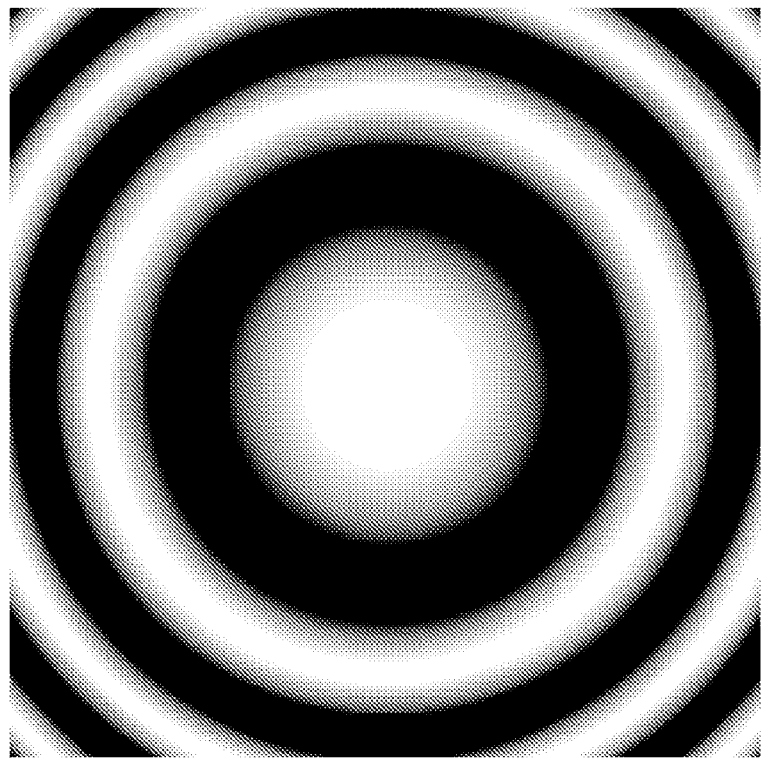
Figure 10A:
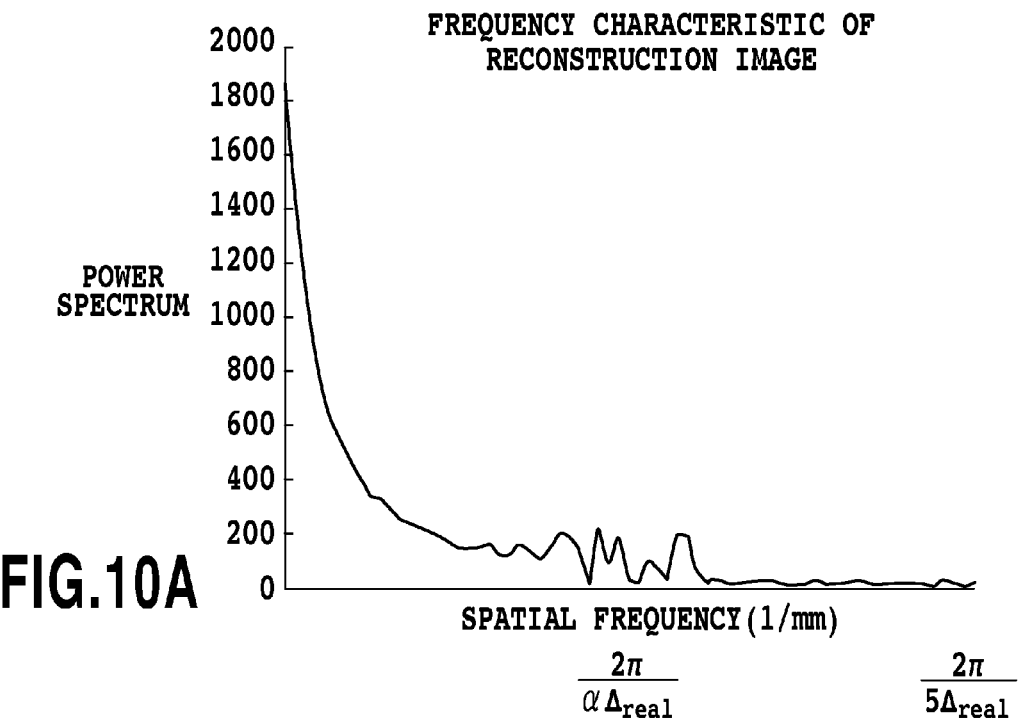
FIGS. 10A and 10B are graphs showing the frequency characteristics of the pieces of image data in FIGS. 9A and 9B.
Figure 10B:
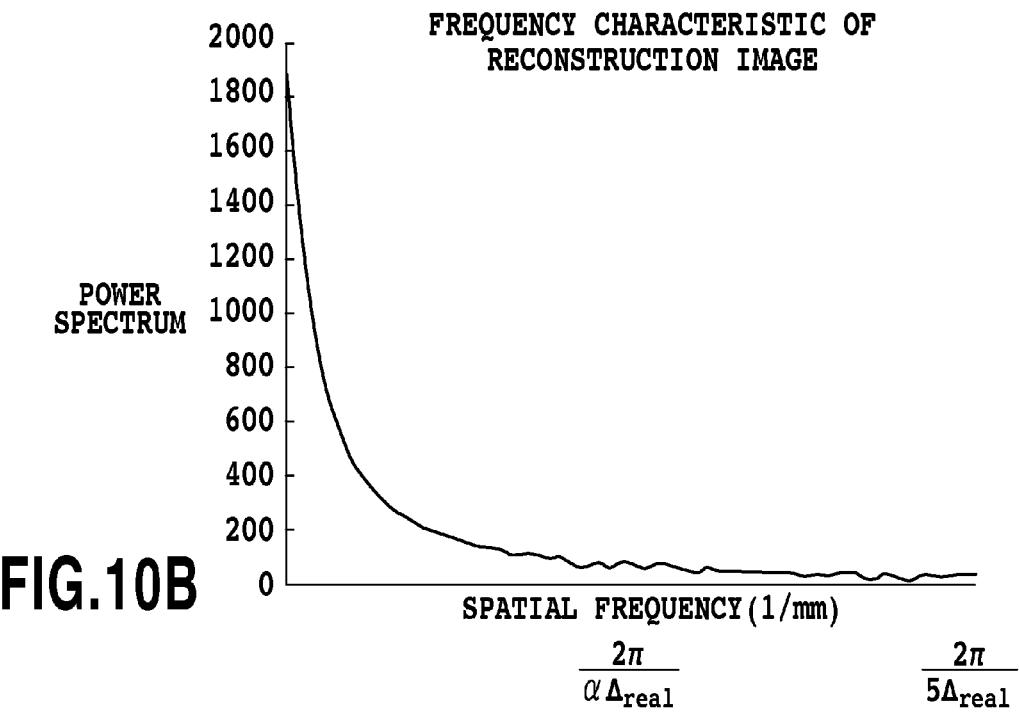

FIG. 9A is synthesized image data in the case where all the weights are uniform, and a nearest neighbor interpolation function is adopted as its interpolation function. FIG. 9B is synthesized image data in the case where weights are determined by the method according to the above-described embodiment as N=5, and the formula (16) is adopted as its interpolation function. FIGS. 10A and 10B show power spectra of cross sections of the images in FIGS. 9A and 9B. FIG. 10A shows a power spectrum of a cross section of the image in FIG. 9A. FIG. 10B shows a power spectrum of a cross section of the image in FIG. 9B. In FIGS. 10A and 10B, $2\pi/(\alpha\Delta_{real})$ is a frequency at which aliasing generates. In comparison of FIG. 10A with FIG. 10B, it can be seen that the aliasing generated in FIG. 10A is suppressed in FIG. 10B.

From FIGS. 9A, 9B, 10A, and 10B, it can be seen that the aliasing is canceled and resolution is increased by the present embodiment.

According to the present embodiment as described above, in the camera array as shown in FIG. 5, by changing the weights in accordance with objects brought into focus, and performing reconstruction, it is possible to cancel aliasing during reconstruction and to increase resolution.

EXAMPLE 2

In the present embodiment, a case where an LF is obtained in an image capturing system different from that of Example 1 will be described.

Figure 11:
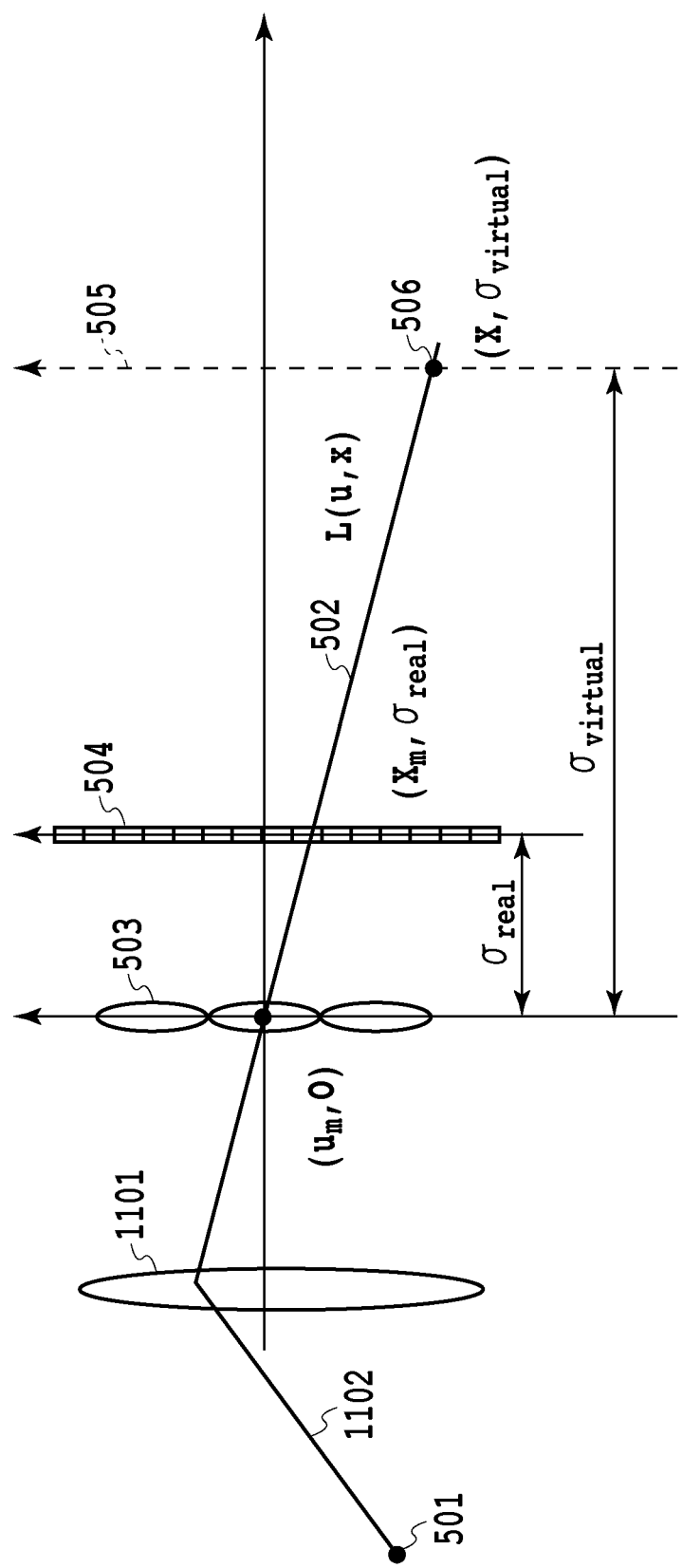
FIG. 11 is a conceptual diagram of the image capturing unit 1301.

FIG. 11 shows another conceptual diagram of the image capturing unit 1301. IF only the difference from FIGS. 5A and 5B is indicated, reference numeral 1101 is a main lens. Reference numeral 1102 is a light beam output from an object. In the present embodiment, in order to distinguish the lens 503 from the main lens, particularly, the lens 503 is referred to as a microlens. Reference numeral 502 represents a light beam of the light beam 1102 bent by the main lens 1101 that passes through the center of the optical axis of the microlens 503. The coordinates at which the light beam 502 intersects the virtual sensor 505 are defined as (X, $\sigma_{virtual}$). Here, $\sigma_{virtual}$ is a positive value. Unlike that of FIG. 5, even if the object is in focus, the object 501 does not agree with the intersection point 506.

The block diagram, and flow chart of the resolution increasing processing unit 100 is the same as those of Example 1 except for the weight determination unit 200 and the image synthesis unit 400.

Here, the difference from Example 1 will be described.

In the image synthesis unit 400, only the operation of the image interpolation unit 403 is different from that of Example 1.

When information obtained by the sensor below the mth microlens 503 is projected on the virtual sensor 505, $I_m(i,j)$ is, by defining the interpolation function as $\varphi$,

[Formula 17]
$$I_m(X) = \sum_{n'} \varphi\left(\frac{x_m}{\Delta_{real}} - n'\right) L(u_m, n'\Delta_{real}) \quad (17)$$

where the definitions of symbols are same as those of Example 1. If the pixel pitch of image data after reconstruction is defined as $\Delta_{virtual}$, and the formula (1) is substituted in the formula (17), the resultant is

[Formula 18]
$$I_m(i,j) = \sum_{n'} \varphi\left(\left(1 - \frac{1}{\alpha}\right)\frac{u_m}{\Delta_{real}} + \frac{i\Delta_{virtual}}{\alpha\Delta_{real}} - n'\right) L(u_m, n'\Delta_{real}) \quad (18)$$

to interpolate image data based on the formula (18) is the operation of the image interpolation unit 403 according to the present embodiment.

In the weight determination unit 200, the operation different from that of Example 1 will now be described.

The shift amount of each piece of image data relative to the same point X of the virtual sensor is, by using the formula (1),

[Formula 19]
$$x_m - x_0 = \left(1 - \frac{1}{\alpha}\right)(u_m - u_0) \quad (19)$$

The pixel shift amount is how many times this shift amount of the image data is as large or small as the pixel pitch of the image capturing element. Accordingly,

[Formula 20]
$$\frac{x_m - x_0}{\Delta_{real}} = \left(1 - \frac{1}{\alpha}\right)\frac{(u_m - u_0)}{\Delta_{real}} \quad (20)$$

represents the pixel shift amount.

This is the pixel shift amount that the pixel shift amount calculation unit 302 calculates theoretically. The sampling of the image capturing element 504 corresponds to the sampling of $\alpha\Delta_{real}$ on the virtual sensor, and the pixel shift amount is expressed by the formula (20). Thus, in the same way as the formula (11) of Example 1 is derived, the frequency property of image data after synthesis of the image synthesis unit 400 is

[Formula 21]
$$F[\varphi](\alpha\Delta_{real}k)\sum_n\sum_m c_m \exp(-i2\pi Z_n \cdot u_m) F[L']\left(k + \frac{2\pi n}{\alpha\Delta_{real}}\right) \quad (21)$$

where Zn is defined as

[Formula 22]
$$Z_n \equiv \left(1 - \frac{1}{\alpha}\right)\frac{n}{\Delta_{real}} \quad (22)$$

The definitions of the other symbols are same as those of Example 1.

The super-resolution magnification determination unit 303 and the weight calculation unit 304 use, as $Z_n$, the formula (22) in place of the formula (9). The other operation is same as that of Example 1.

According to the present embodiment as described above, it is possible to increase resolution, also in an image capturing apparatus for obtaining an LF of another form in which a main lens is combined with a microlens array.

Also, it is possible to increase resolution in a similar manner also in an image capturing apparatus for obtaining an LF other than those of Example 1 and Example 2.

EXAMPLE 3

Figure 12A:
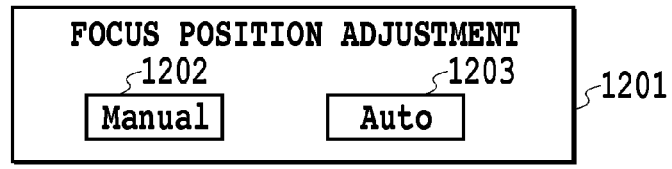
FIGS. 12A to 12C are conceptual diagrams of a UI of an object selection unit 600.
Figure 12B:
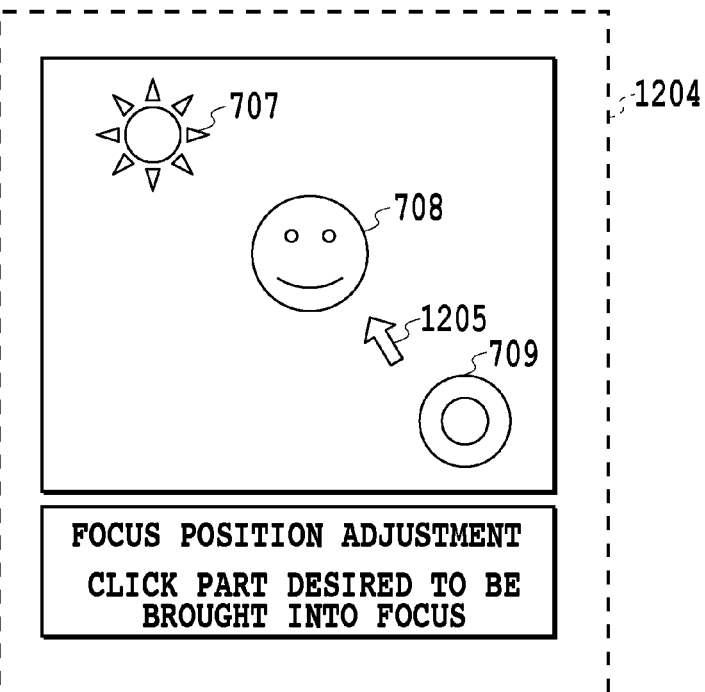
Figure 12C:
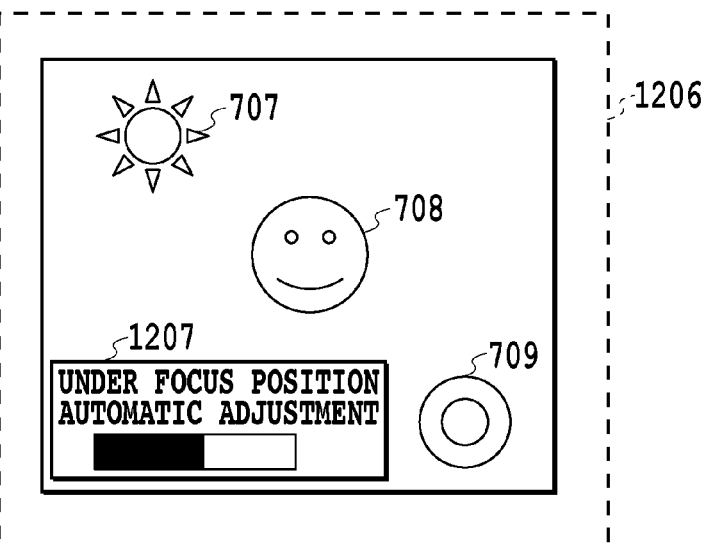

In the present embodiment, in the UI of the object selection unit 600 in FIG. 1, how to select an object brought into focus will be described. FIGS. 12A to 12C show an example of how to select an object to be brought into focus.

In FIG. 12A, reference numeral 1201 is a screen for focus position adjustment. Reference numeral 1202 is a button that a user selects when the user wants to select a focus position. Reference numeral 1203 is a button to be selected when automatically brought into focus. When the button 1202 is pressed, the screen of the object selection unit 600 is switched to FIG. 12B.

In FIG. 12B, reference numeral 1204 is a conceptual diagram of a UI screen displayed on the screen of the object selection unit 600 when the button 1202 is selected. Reference numeral 1205 is a cursor.

The user sets the cursor on an object desired to be brought into focus and clicks the object. Thereby, an object to be brought into focus is determined. That is, the object selection unit 600 functions as a selection unit of an object and determines an object to be brought into focus in accordance with the user instruction.

When the button 1203 is pressed, the screen is switched to FIG. 12C, in which reference numeral 1206 is a conceptual diagram of a UI screen displayed on the screen of the object selection unit 600 when the button 1203 is selected. Reference numeral 1207 is a progress bar indicating the progress of processing for automatic focusing. At this time, as a method for automatic focusing, for example, there is a method for bringing the object 708 into focus by using a face recognition technology. Also, if focusing is automatic focusing that reflects needs of users, it is not limited to the above-described method. That is, the object selection unit 600 functions as a selection unit of an object and determines an object to be brought automatically into focus.

In FIGS. 12B and 12C, although one typical image of images that the small camera 507 obtains is displayed, an image that is appropriately weighted and reconstructed at a certain appropriate virtual sensor position may be displayed.

As described above, according to Example 3, a user gives an instruction on a UI screen of the object selection unit 600, and thereby, an object to be brought into focus can be determined.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-128466, filed Jun. 8, 2011, which is hereby incorporated by reference herein in its entirety.

What is claimed is:

1. An image processing device comprising:
   a weight determination unit configured to obtain a plurality of pieces of image data photographed at multiple viewpoints and to determine a weight of each of the plurality of pieces of image data for synthesizing the plurality of pieces of image data; and
   a generation unit configured to generate, by synthesizing the plurality of pieces of image data according to the weight determined by the weight determination unit, synthesized image data focused at a focus position different from focus positions of the plurality of pieces of image data,
   wherein the weight determination unit determines the weight so that an aliasing element included in frequency characteristics of the plurality of pieces of image data is reduced in the synthesized image data.

2. The image processing device according to claim 1, wherein the weight determination unit derives the aliasing element included in the frequency characteristics of the image data by using pixel shift amount of the plurality of pieces of image data.

3. The image processing device according to claim 1, wherein the weight determination unit determines the weight for the synthesis by using a number of suppressible aliasings determined in accordance with pixel shift amount of the plurality of pieces of image data.

4. The image processing device according to claim 1, further comprising a unit configured to determine an interpolation function for the synthesis so as to suppress aliasing other than suppressible aliasing determined in accordance with pixel shift amount, wherein the generation unit synthesizes the plurality of pieces of image data utilizing the weights and the interpolation function.

5. The image processing device according to claim 1, further comprising a selection unit configured to select an object,
   wherein the predetermined focus position is based on selection by the selection unit.

6. The image processing device according to claim 5, wherein the selection unit selects the object based on selection by a user, or automatically.

7. The image processing apparatus according to claim 1, wherein the weight determination unit determines the weight based on the focus position of the synthesized image data and a camera parameter exhibiting a property of an imaging apparatus that photographed the plurality of pieces of image data.

8. The image processing apparatus according to claim 7, wherein
   the weight determination unit comprises a unit configured to calculate a pixel shift amount between the plurality of pieces of image data based on the focus position of the synthesized image data and the camera parameter, and
   the weight determination unit determines the weight by using the calculated pixel shift amount.

9. The image processing apparatus according to claim 8, wherein
   the weight determination unit comprises a unit configured to determine a number of suppressible aliasing based on the calculated pixel shift amount, and
   the weight determination unit determines the weight by using the calculated pixel shift amount and the determined number of suppressible aliasing.

10. The image processing apparatus according to claim 7, wherein the weight determination unit determines the weight based on a distance from a lens position of the imaging apparatus to a virtual sensor position which represents the focus position of the synthesized image data and a distance from the lens position of the imaging apparatus to a position of a imaging sensor of the imaging apparatus.

11. The image processing apparatus according to claim 10, wherein
the weight determination unit determines the weight so that an absolute value of Bn becomes smaller, wherein $B_n$ is described by the equation below $$B_n \equiv \sum_m c_m \exp(-i2\pi Z_n \cdot u_m)$$

where m is a number assigned to each of the plurality pieces of image data, $c_m$ is the weight of each of the plurality of pieces of image data, $u_m$ is a vector representing a viewpoint position corresponding to each of the plurality of pieces of image data and $Z_n$ is a vector described by the equation below, $$Z_n = \frac{\sigma_{real} \cdot n}{\sigma_{virtual} \cdot \Delta_{real}}$$

where n is a number assigned to the aliasing element, $\sigma_{virtual}$ is the distance from the lens position of the imaging apparatus to the virtual sensor position, $\sigma_{real}$ is the distance from the lens position of the imaging apparatus to the position of the imaging sensor of the imaging apparatus and $\Delta_{real}$ is a pixel pitch of the imaging sensor.

12. An image capturing apparatus, comprising:
an image capturing unit configured to obtain a plurality of pieces of image data having a parallax;
a weight determination unit configured to determine a weight of each of the plurality of pieces of image data for synthesizing the plurality of pieces of image data; and
a generation unit configured to generate, by synthesizing the plurality of pieces of image data according to the weight determined by the weight determination unit, synthesized image data focused at a focus position different from focus positions of the plurality of pieces of image data,
wherein the weight determination unit determines the weight so that an aliasing element included in frequency characteristics of the plurality of pieces of image data is reduced in the synthesized image data.

13. An image processing method comprising:
an obtaining step of obtaining a plurality of pieces of image data photographed at photographed at multiple viewpoints;
a weight determination step of determining a weight of each of the plurality of pieces of image data for synthesizing the plurality of pieces of image data; and
a generation step of generating, by synthesizing the plurality of pieces of image data according to the weight determined by the weight determination step, synthesized image data focused at a focus position different from focus positions of the plurality of pieces of image data,
wherein the weight determination step is a step of determining the weight so that an aliasing element included in frequency characteristics of the plurality of pieces of image data is reduced in the synthesized image data.

14. A non-transitory computer-readable recording medium having computer-executable instructions for performing a method, the method comprising:
an obtaining step of obtaining a plurality of pieces of image data photographed at photographed at multiple viewpoints;
a weight determination step of determining a weight of each of the plurality of pieces of image data for synthesizing the plurality of pieces of image data; and
a generation step of generating, by synthesizing the plurality of pieces of image data according to the weight determined by the weight determination step, synthesized image data focused at a focus position different from focus positions of the plurality of pieces of image data,
wherein the weight determination step is a step of determining the weight so that an aliasing element included in frequency characteristics of the plurality of pieces of image data is reduced in the synthesized image data.

* * * * *